(12) United States Patent
Chang

(10) Patent No.: US 11,209,050 B1
(45) Date of Patent: Dec. 28, 2021

(54) CONTAMINATION-RESISTANT BEARING ASSEMBLY

(71) Applicant: THAI DIENG INDUSTRY CO., LTD., Taichung (TW)

(72) Inventor: Cheng-Wei Chang, Taichung (TW)

(73) Assignee: THAI DIENG INDUSTRY CO., LTD., Taichung (TW)

( * ) Notice: Subject to any disclaimer, the term of this patent is extended or adjusted under 35 U.S.C. 154(b) by 0 days.

(21) Appl. No.: 17/073,982

(22) Filed: Oct. 19, 2020

(51) Int. Cl.
*F16C 33/78* (2006.01)
*F16C 19/16* (2006.01)

(52) U.S. Cl.
CPC ........ *F16C 33/7896* (2013.01); *F16C 33/782* (2013.01); *F16C 33/7853* (2013.01); *F16C 33/7889* (2013.01); *F16C 19/16* (2013.01); *F16C 33/7823* (2013.01)

(58) Field of Classification Search
CPC .... F16C 19/16; F16C 33/7816; F16C 33/782; F16C 33/7823; F16C 33/7826; F16C 33/7853; F16C 33/7859; F16C 33/7863; F16C 33/7889; F16C 33/7896; F16J 15/32
See application file for complete search history.

(56) References Cited

U.S. PATENT DOCUMENTS

| 5,927,864 A * | 7/1999 | Feerick | F16C 33/7869 384/482 |
|---|---|---|---|
| 2011/0019952 A1* | 1/2011 | Gutowski | F16C 33/7866 384/477 |
| 2019/0085905 A1* | 3/2019 | Nebbia Colomba | F16C 33/7853 |

FOREIGN PATENT DOCUMENTS

| JP | 63130921 A | * | 6/1988 | .......... F16C 33/7896 |
|---|---|---|---|---|
| JP | 2011174566 A | * | 9/2011 | .......... F16C 33/7896 |
| JP | 2017210992 A | * | 11/2017 | .......... F16J 15/3232 |

* cited by examiner

*Primary Examiner* — Alan B Waits
(74) *Attorney, Agent, or Firm* — Birch, Stewart, Kolasch & Birch, LLP

(57) ABSTRACT

A contamination-resistant bearing assembly includes an inner ring, an outer ring, a rolling unit, two contamination-resistant internal sleeves and two contamination-resistant external sleeves. The outer ring cooperates with the inner ring to define a bearing space where the rolling unit and the sleeves are disposed. The external sleeves are located at two opposite sides of the internal sleeves which are located at two opposite sides of the rolling unit in an axial direction. Each of the external sleeves includes a metal rigid shell and a sealing member.

11 Claims, 4 Drawing Sheets

CONTAMINATION-RESISTANT BEARING ASSEMBLY

FIELD

The disclosure relates to a bearing, and more particularly to a contamination-resistant bearing assembly.

BACKGROUND

A conventional bearing disclosed in U.S. Pat. No. 9,157,475 as shown in FIG. 1 includes an inner ring 910, an outer ring 920 that extends about an axial line (A) to surround the inner ring 910 and that is spaced apart from the inner ring 910, a plurality of rolling members 930 that are disposed and rollable between the inner ring 910 and the outer ring 920, two internal sealing units 940 that are disposed between the inner ring 910 and the outer ring 920, and two external sealing units 950 that are disposed between the inner ring 910 and the outer ring 920. The internal sealing units 940 and the external sealing units 950 are provided on both sides of the rolling members 930. The internal sealing units 940 are located between the external sealing units 950 in a direction of the axial line (A). Because structures of the internal sealing unit 940 and the external sealing unit 950 on one side of the rolling members 930 in the direction of the axial line (A) are substantially the same as the structures of the internal sealing unit 940 and the external sealing unit 950 on the opposite side of the rolling members 930 in the direction of the axial line (A), only the structures of the internal sealing unit 940 and the external sealing unit 950 on one side will be described below. The internal sealing unit 940 has an inner metal ring 941 that has an end fixed to the outer ring 920, and an internal sealing member 942 that is mounted to an axially-inner side of the inner metal ring 941 and that is in slidable contact with the inner ring 910. The external sealing unit 950 has an outer metal ring 951 that has an end fixed to the inner ring 910, and an external sealing member 952 that is mounted to an axially-inner side of the outer metal ring 951 and that is in slidable contact with the outer ring 920. The inner metal ring 941 and the outer metal ring 951 are both bent. A free end of the inner metal ring 941 that is not fixed to the outer ring 920 and a free end of the outer metal ring 951 that is not fixed to the inner metal ring 910 are respectively spaced apart from the inner ring 910 and the outer ring 920. The bent inner metal ring 941, the bent outer metal ring 951 and the free end of the outer metal ring 951 that is spaced apart from the outer ring 920 lead to a low structural strength of the conventional bearing, especially low radial structural strength. The bent outer metal ring 951 and the free end of the outer metal ring 951 that is spaced apart from the outer ring 920 further increase the likelihood of deformation when an external force is applied. Thus, the sealability of the conventional bearing is compromised by the low structural strength and the relatively high probability of deformation.

SUMMARY

Therefore, an object of the disclosure is to provide a contamination-resistant bearing assembly that can alleviate at least one of the drawbacks of the prior art.

According to the disclosure, the contamination-resistant bearing assembly includes an inner ring, an outer ring, a rolling unit, two contamination-resistant internal sleeves and two contamination-resistant external sleeves. The outer ring extends about an axial line to surround the inner ring. The outer ring is spaced apart from the inner ring in a radial direction of both of the inner ring and the outer ring and cooperates with the inner ring to define a bearing space. The axial line extends in an axial direction. The rolling unit includes a plurality of rolling members that are disposed in the bearing space. The rolling members are for allowing the inner ring and the outer ring to rotate relative to each other around the axial line. The contamination-resistant internal sleeves are disposed in the bearing space and are respectively located at two opposite sides of the rolling unit in the axial direction. Each of the contamination-resistant internal sleeves includes a metal ring that is mounted to one of the inner ring and the outer ring, and an internal sealing member that is connected to the metal ring. The internal sealing member of each of the contamination-resistant internal sleeves has at least one pressed lip that has an end in slidable contact with the other one of the inner ring and the outer ring. The contamination-resistant external sleeves are disposed in the bearing space and are respectively located at two opposite sides of the contamination-resistant internal sleeves in the axial direction. Each of the contamination-resistant external sleeves includes a metal rigid shell that extends in the radial direction, and an external sealing member. The metal rigid shell of each of the contamination-resistant external sleeves includes a fixed end part that is mounted to the other one of the inner ring and the outer ring, and a throttling end part that is adjacent to the one of the inner ring and the outer ring. The throttling end part of the metal rigid shell of each of the contamination-resistant external sleeves has a ring groove, and two throttling ends that are respectively located inwardly and outwardly of the ring groove in the axial direction. Each of the throttling ends cooperates with the one of the inner ring and the outer ring to define a first throttling gap. The external sealing member of each of the contamination-resistant external sleeves is disposed within the ring groove of the metal rigid shell of the contamination-resistant external sleeve and is in slidable contact with the one of the inner ring and the outer ring.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
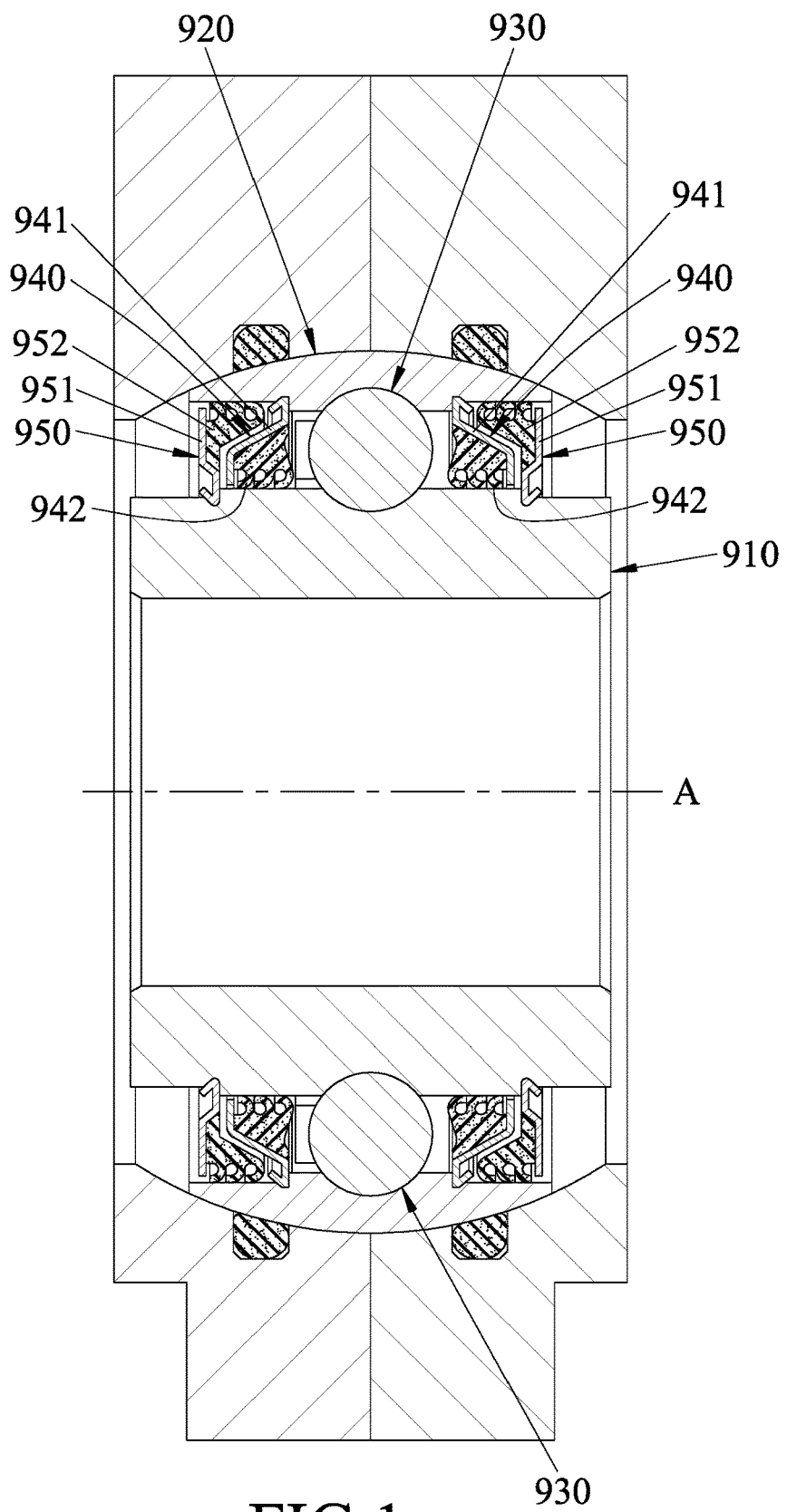
FIG. 1 is a sectional view illustrating a conventional bearing.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
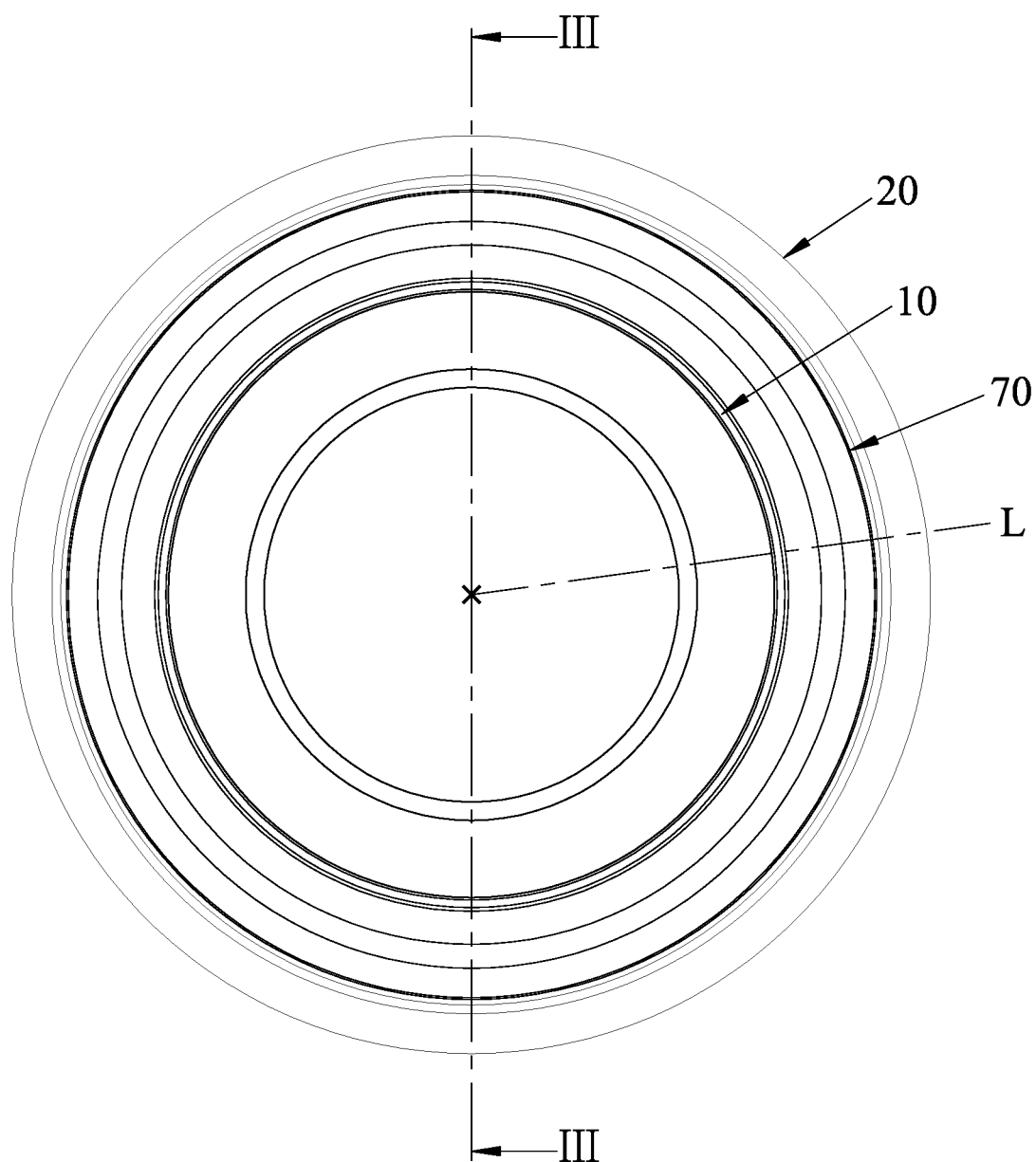
FIG. 2 is a front view illustrating an embodiment of the contamination-resistant bearing assembly according to the disclosure.
Figure 3:
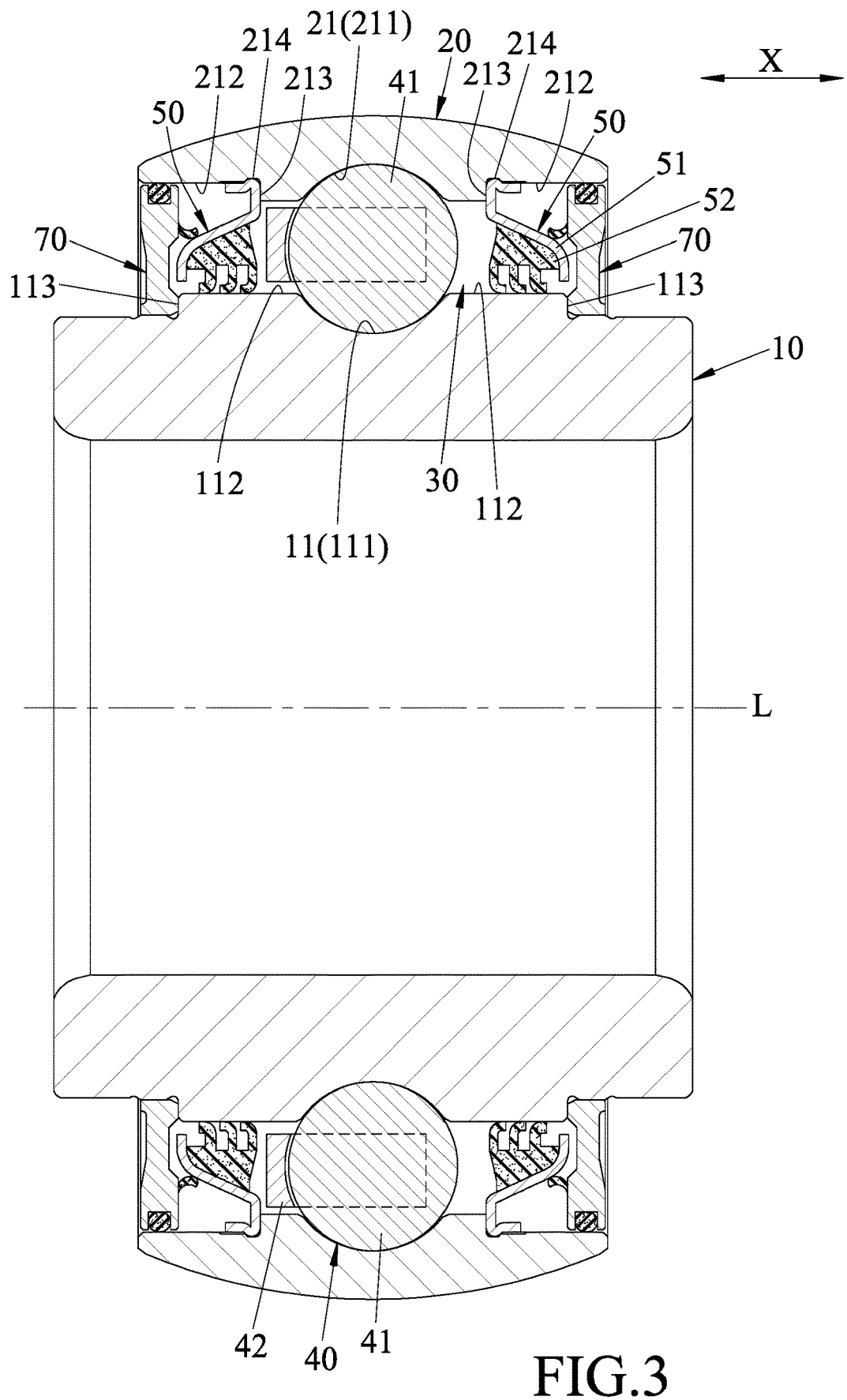
FIG. 3 is a sectional view taken along line III-III in FIG. 2.

Referring to FIGS. 2 and 3, an embodiment of a contamination-resistant bearing assembly according to the disclosure includes an inner ring 10, an outer ring 20, a rolling unit 40, two contamination-resistant internal sleeves 50 and two contamination-resistant external sleeves 70.

The inner ring 10 has an outer surrounding surface 11 that surrounds an axial line (L). The axial line (L) extends in an axial direction (X). The outer surrounding surface 11 has an outer annular groove part 111, two outer sliding parts 112 that are substantially parallel to the axial line (L), and two outer shoulder parts 113 that are substantially perpendicular to the axial direction (X). The outer sliding parts 112 are respectively located at two opposite sides of the outer annular groove part 111 in the axial direction (X), and so are the outer shoulder parts 113.

The outer ring 20 extends about the axial line (L) to surround the inner ring 10. The outer ring 20 is spaced apart from the inner ring 10 in a radial direction of both of the inner ring 10 and the outer ring 20 and cooperates with the inner ring 10 to define a bearing space 30. The outer ring 20 has an inner surrounding surface 21 that surrounds the axial line (L). The inner surrounding surface 21 has an inner annular groove part 211, two inner sliding parts 212 that are substantially parallel to the axial line (L), and two inner shoulder parts 213 that are substantially perpendicular to the axial direction (X), and is formed with two grooves 214 that are respectively adjacent to the inner shoulder parts 213. The inner sliding parts 212 are respectively located at two opposite sides of the inner annular groove part 211 in the axial direction (X), and so are the inner shoulder parts 213.

In this embodiment, the outer shoulder parts 113 are respectively located outwardly of the outer sliding parts 112 and face outwardly in the axial direction (X), and the inner shoulder parts 213 are respectively located inwardly of the inner sliding parts 212 and face outwardly in the axial direction (X). The outer shoulder parts 113 are respectively located outwardly of the inner shoulder parts 213 in the axial direction (X). However, in practice, variations can be made to the relative locations of the outer shoulder parts 113, the outer sliding parts 112, the inner shoulder parts 213 and the inner sliding parts 212.

The rolling unit 40 includes a plurality of rolling members 41 that are disposed in the bearing space 30 and a retainer 42 that is for allowing the rolling members 41 to be disposed. The rolling members 41 are in rotatable contact with the inner annular groove part 211 and the outer annular groove part 111 and are for allowing the inner ring 10 and the outer ring 20 to rotate relative to each other around the axial line (L). In this embodiment, the rolling members 41 are balls, but other types of the rolling members, such as needle rollers, can also be used.

Figure 4:
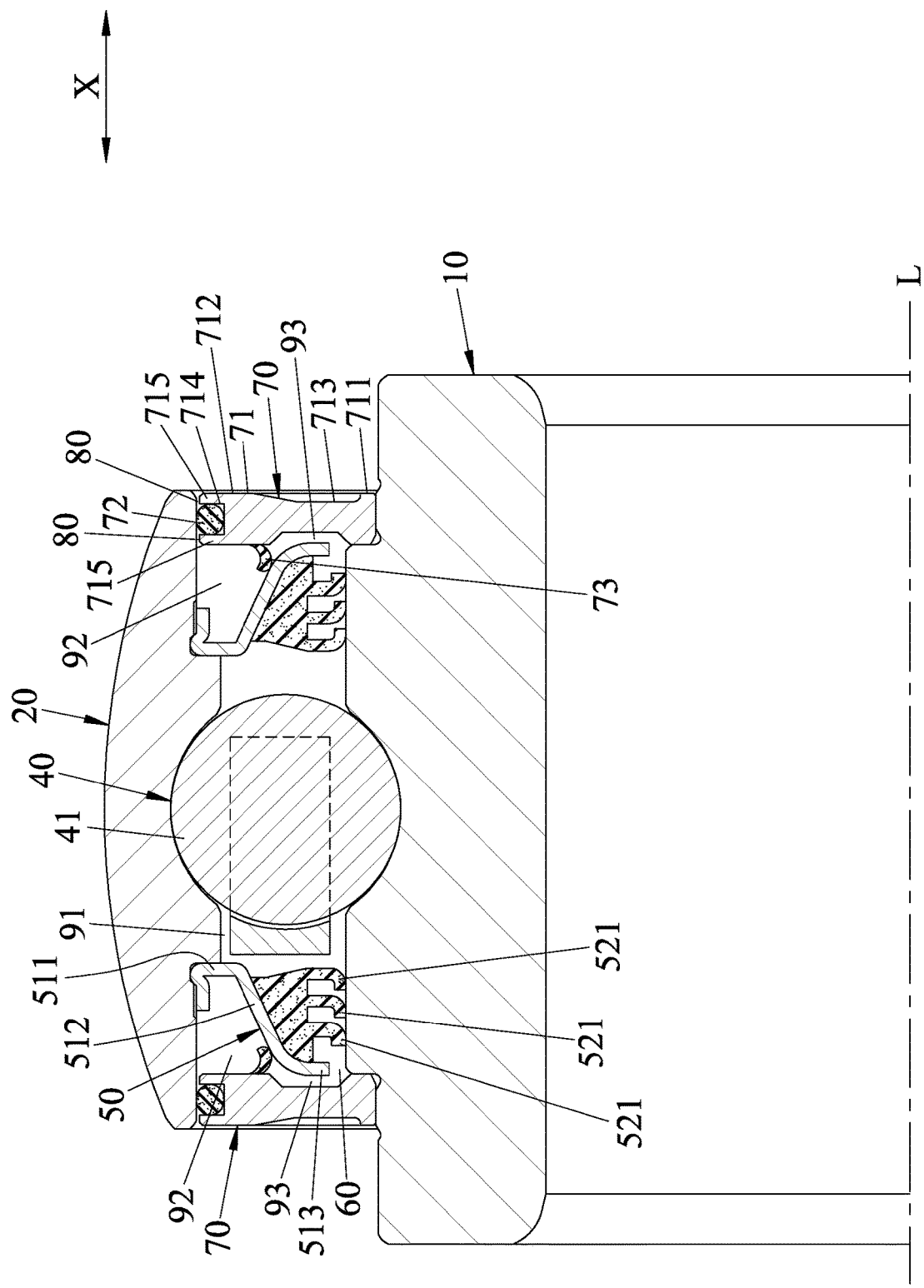
FIG. 4 is a fragmentary enlarged view of FIG. 3.

Referring to FIGS. 3 and 4, the contamination-resistant internal sleeves 50 are disposed in the bearing space 30 and are respectively located at two opposite sides of the rolling unit 40 in the axial direction (X). Each of the contamination-resistant internal sleeves 50 includes a metal ring 51 that is mounted to one of the inner ring 10 and the outer ring 20, and an internal sealing member 52 that is connected to the metal ring 51 and that is in slidable contact with the other one of the inner ring 10 and the outer ring 20. It is noted herein that the expression "one of the inner ring 10 and the outer ring 20" means "either the inner ring 10 or the outer ring 20."

More specifically, in this embodiment, the metal ring 51 of each of the contamination-resistant internal sleeves 50 is mounted to the outer ring 20, and has a fixed section 511 that is fixedly mounted to a respective one of the grooves 214, a sloping section 512 that inclines and extends from the fixed section 511 toward the outer surrounding surface 11 and away from the rolling unit 40, and an end section 513 that is connected to the sloping section 512 and that extends toward the outer surrounding surface 11. However, one or more different ways of how the fixed section 511 is mounted to the outer ring 20 can also be practiced. In addition, the fixed section 511 of the metal ring 51 of each of the contamination-resistant internal sleeves 50 abuts against a respective one of the inner shoulder parts 213 in order to position the contamination-resistant internal sleeve 50 relative to the outer ring 20 and the inner ring 10 in the axial direction (X). The end section 513 of the metal ring 51 of each contamination-resistant internal sleeve 50 cooperates with a respective one of the outer sliding parts 112 to define a throttling gap 60.

The internal sealing member 52 of each of the contamination-resistant internal sleeves 50 is connected at least to the sloping section 512 of the metal ring 51 of the contamination-resistant internal sleeve 50 and has at least one pressed lip 521. An end of each pressed lip 521 is in slidable contact with the respective one of the outer sliding parts 112 and extends outwardly in the axial direction (X). In this embodiment, the internal sealing member 52 of each of the contamination-resistant internal sleeves 50 has three pressed lips 521. The pressed lips 521 are spaced apart from each other in the axial direction (X) and can be made of materials that are suitable for sealing, such as rubber (e.g., silicone rubber).

The contamination-resistant external sleeves 70 are disposed in the bearing space 30 and are respectively located at two opposite sides of the contamination-resistant internal sleeves 50 in the axial direction (X). Each of the contamination-resistant external sleeves 70 includes a metal rigid shell 71 that is mounted to the other one of the inner ring 10 and the outer ring 20 and that extends in the radial direction, an external sealing member 72 that is disposed at the metal rigid shell 71 and that is in slidable contact with the one of the inner ring 10 and the outer ring 20, and an intermediate sealing member 73 that is disposed at an inward surface of the metal rigid shell 71 and that extends from the metal rigid shell 71 to the metal ring 51 of a respective one of the contamination-resistant internal sleeves 50.

More specifically, in this embodiment, the metal rigid shell 71 of each of the contamination-resistant external sleeves 70 is mounted to the inner ring 10, and has a fixed end part 711 that is mounted to the outer surrounding surface 11, a throttling end part 712 that is adjacent to the outer ring 20, and a waist part 713 that is connected between the fixed end part 711 and the throttling end part 712 of the metal rigid shell 71. In practice, there may be multiple different ways of fixing the fixed end part 711 to the inner ring 10, and an exemplary implementation is to press-fit the inner ring 10 into the fixed end part 711 of the metal rigid shell 71. In addition, the fixed end part 711 of the metal rigid shell 71 of each of the contamination-resistant external sleeves 70 abuts against a respective one of the outer shoulder parts 113 in order to position the contamination-resistant external sleeve 70 relative to the outer ring 20 and the inner ring 10 in the axial direction (X). The inward surface of the metal rigid shell 71 of each of the contamination-resistant external sleeves 70 is recessed at a position of the waist part 713 outwardly in the axial direction (X) in order to accommodate the end section 513 of the metal ring 51 of the respective one of the contamination-resistant internal sleeves 50. The throttling end part 712 of each of the contamination-resistant external sleeves 70 has a ring groove 714, and two throttling ends 715 that are respectively located inwardly and outwardly of the ring groove 714 in the axial direction (X). Each of the throttling ends 715 cooperates with one of the inner sliding parts 212 that corresponds to the corresponding contamination-resistant external sleeve 70 to define a throttling gap 80. For clarity purposes, the throttling gap 80 will hereinafter be referred to as the first throttling gap 80, while the throttling gap 60 will hereinafter be referred to as the second throttling gap 60. Each first throttling gap 80 of each contamination-resistant external sleeve 70 ranges from 0.1 millimeters to 0.3 millimeters in the radial direction.

The external sealing member 72 of each of the contamination-resistant external sleeves 70 is disposed within the ring groove 714 of the contamination-resistant external sleeve 70 and is in slidable contact with a respective one of the inner sliding parts 212. An end of the intermediate sealing member 73 of each of the contamination-resistant external sleeves 70 is in slidable contact with a surface of the sloping section 512 of the respective one of the contamination-resistant internal sleeves 50 opposite to the internal sealing member 52 of the respective one of the contamination-resistant internal sleeves 50 and extends inwardly in the axial direction (X). The intermediate sealing member 73 of each of the contamination-resistant external sleeves 70 is located outwardly of the at least one pressed lip 521 of the internal sealing member 52 of the respective one of the contamination-resistant internal sleeves 50 in the axial direction (X), and a distance between the intermediate sealing member 73 of each of the contamination-resistant external sleeves 70 and the axial line (L) is different from that between the at least one pressed lip 521 of the internal sealing member 52 of the respective one of the contamination-resistant internal sleeves 50 and the axial line (L) (i.e., the intermediate sealing member 73 does not overlap radially with the at least one pressed lip 521). The internal sealing member 52 that has three pressed lips 521 according to this embodiment is configured such that the intermediate sealing member 73 of each of the contamination-resistant external sleeves 70 is located outwardly of the outwardmost one of the pressed lips 521 of the internal sealing member 52 of the respective one of the contamination-resistant internal sleeves 50 in the axial direction (X), and a distance between the intermediate sealing member 73 of each of the contamination-resistant external sleeves 70 and the axial line (L) is different from that between the outwardmost one of the pressed lips 521 of the internal sealing member 52 of the respective one of the contamination-resistant internal sleeves 50 and the axial line (L). The external sealing member 72 and the intermediate sealing member 73 of each of the contamination-resistant external sleeves 70 can be made of materials that are suitable for sealing, such as rubber (e.g., silicone rubber).

The contamination-resistant internal sleeves 50 define a first lubrication zone 91 therebetween. The intermediate sealing member 73 and the metal rigid shell 71 of each of the contamination-resistant external sleeves 70 cooperate with the metal ring 51 of the respective one of the contamination-resistant internal sleeves 50 to define a second lubrication zone 92 that is adjacent to the throttling end part 712 of the metal rigid shell 71 and a third lubrication zone 93 that is adjacent to the fixed end part 711 of the metal rigid shell 71. The first lubrication zone 91 and the second lubrication zones 92 contain lubricants (not shown).

Because structures on opposite side of the rolling unit 40 in the axial direction (X) are substantially the same in this embodiment, the following description on how the embodiment of the contamination-resistant bearing assembly according to the disclosure achieves a contamination-resistant effect only discusses the structure from one of the two sides as an example.

Even though external contaminants such as dust or wastewater might enter the contamination-resistant bearing assembly when the contamination-resistant bearing assembly is in use, there is only one possible path for the contaminants to reach the rolling unit 40. The contaminants must pass inwardly through the outward one of the first throttling gaps 80, the external sealing member 72 and the inward one of the first throttling gaps 80 in the axial direction (X) to enter the second lubrication zone 92. After that, the contaminants have to move outwardly in the axial direction (X) and radially inwardly to pass the intermediate sealing member 73, and then move radially inwardly again before they can arrive at the third lubrication zone 93. Then, from the third lubrication zone 93, the contaminants cannot reach the first lubrication zone 91 and the rolling unit 40 without moving inwardly in the axial direction (X) to pass the second throttling gap 60 and the pressed lips 521. Possible as it may be, the only path is still too winding and includes the first throttling gaps 80 and the second throttling gap 60 that are able to greatly decrease the velocity, the kinetic energy and the dynamic pressure of contaminants passing through. Therefore, incoming contaminants are prevented from further traveling toward the rolling unit 40 of the contamination-resistant bearing assembly. Besides, the difficulty for the contaminants to reach the rolling unit 40 is greatly increased by multiple sealing arrangements like the external sealing member 72, the intermediate sealing member 73 and the pressed lips 521, and spaces filled with the lubricants like the second lubrication zone 92, the third lubrication zone 93 and the first lubrication zone 91. Furthermore, the metal rigid shell 71 is able to resist an external force and prevent the contamination-resistant external sleeve 70 from deforming, so that sealability of the contamination-resistant external sleeve 70 can be well maintained. Because the metal rigid shell 71 is made of metal, is rigid, and extends radially, and because the external sealing member 72 is disposed within the ring groove 714 of the throttling end part 712 and is in slidable contact with the outer ring 20, a radial supporting effect is well provided by the contamination-resistant external sleeve 70 and an overall structural strength of the contamination-resistant bearing assembly is enhanced.

It should be noted that one or more other embodiments of the contamination-resistant bearing assembly can be practiced with the contamination-resistant internal sleeves 50 and the contamination-resistant external sleeves 70 arranged in a radially reverse order from the embodiment disclosed above. This means that the metal rings 51 of the contamination-resistant internal sleeves 50 can be mounted to the inner ring 10 while the metal rigid shells 71 of the contamination-resistant external sleeves 70 are mounted to the outer ring 20. Under this circumstance, the outer shoulder parts 113 are respectively located inwardly of the outer sliding parts 112 and face outwardly in the axial direction (X), and the inner shoulder parts 213 are respectively located outwardly of the inner sliding parts 212 in the axial direction (X). The outer shoulder parts 113 are respectively located inwardly of the inner shoulder parts 213 in the axial direction (X), and the grooves 214 are formed in the outer surrounding surface 11 and are respectively adjacent to the outer shoulder parts 113. In addition, one or more other embodiments of the contamination-resistant bearing assembly can also be practiced with one side of the rolling unit 40 in the axial direction (X) having the contamination-resistant internal sleeve 50 mounted to the outer ring 20 and the respective contamination-resistant external sleeve 70 mounted to the inner ring 10 and with the opposite side of the rolling unit 40 in the axial direction (X) having the contamination-resistant internal sleeve 50 mounted to the inner ring 10 and the respective contamination-resistant external sleeve 70 mounted to the outer ring 20.

In summary, with a sealing structure constructed by both of the contamination-resistant internal sleeves 50 and the contamination-resistant external sleeves 70, the embodiment of the contamination-resistant bearing assembly according to the disclosure is able to achieve an effect of preventing contaminants from reaching the rolling unit 40, in order to prevent bearing failure that is caused by accumulated contaminants around the rolling unit 40, the inner ring 10 and the outer ring 20. Furthermore, with such construction of the contamination-resistant external sleeves 70, the sealability of the contamination-resistant bearing assembly can be well maintained, and the overall structural strength of the contamination-resistant bearing assembly is also enhanced. Therefore, the purpose of the disclosure can certainly be fulfilled.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A contamination-resistant bearing assembly comprising:
    an inner ring;
    an outer ring extending about an axial line to surround said inner ring, said outer ring being spaced apart from said inner ring in a radial direction of both of said inner ring and said outer ring and cooperating with said inner ring to define a bearing space, the axial line extending in an axial direction;
    a rolling unit including a plurality of rolling members that are disposed in said bearing space, said rolling members being for allowing said inner ring and said outer ring to rotate relative to each other around the axial line;
    two contamination-resistant internal sleeves disposed in said bearing space and respectively located at two opposite sides of said rolling unit in the axial direction, each of said contamination-resistant internal sleeves including a metal ring that is mounted to one of said inner ring and said outer ring, and an internal sealing member that is connected to said metal ring, said internal sealing member of each of said contamination-resistant internal sleeves having at least one pressed lip that has an end in slidable contact with the other one of said inner ring and said outer ring; and
    two contamination-resistant external sleeves disposed in said bearing space and respectively located at two opposite sides of said contamination-resistant internal sleeves in the axial direction, each of said contamination-resistant external sleeves including a metal rigid shell that extends in the radial direction, and an external sealing member, said metal rigid shell of each of said contamination-resistant external sleeves including a fixed end part that is mounted to the other one of said inner ring and said outer ring, and a throttling end part that is adjacent to the one of said inner ring and said outer ring, said throttling end part of said metal rigid shell of each of said contamination-resistant external sleeves having a ring groove, and two throttling ends that are respectively located inwardly and outwardly of said ring groove in the axial direction, each of said throttling ends cooperating with the one of said inner ring and said outer ring to define a first throttling gap, said external sealing member of each of said contamination-resistant external sleeves being disposed within said ring groove of said metal rigid shell of said contamination-resistant external sleeve and being in slidable contact with the one of said inner ring and said outer ring.

2. The contamination-resistant bearing assembly as claimed in claim 1, wherein a width of the first throttling gap in the radial direction ranges from 0.1 millimeters to 0.3 millimeters.

3. The contamination-resistant bearing assembly as claimed in claim 1, wherein said metal ring of each of said contamination-resistant internal sleeves has a fixed section fixedly mounted to the one of said inner ring and said outer ring, a sloping section inclining and extending from said fixed section toward the other one of said inner ring and said outer ring and away from said rolling unit, and an end section connected to said sloping section and extending toward the other one of said inner ring and said outer ring.

4. The contamination-resistant bearing assembly as claimed in claim 1, wherein each of said contamination-resistant external sleeves further includes an intermediate sealing member disposed at an inward surface of said metal rigid shell and extending from said metal rigid shell to said metal ring of a respective one of said contamination-resistant internal sleeves, an end of said intermediate sealing member of each of said contamination-resistant external sleeves being in slidable contact with said metal ring of the respective one of said contamination-resistant internal sleeves, said intermediate sealing member of each of said contamination-resistant external sleeves being located outwardly of said pressed lip of said internal sealing member of the respective one of said contamination-resistant internal sleeves in the axial direction, a distance between said intermediate sealing member of each of said contamination-resistant external sleeves and the axial line being different from that between said pressed lip of said internal sealing member of the respective one of said contamination-resistant internal sleeves and the axial line.

5. The contamination-resistant bearing assembly as claimed in claim 4, wherein said contamination-resistant internal sleeves define a first lubrication zone therebetween, said intermediate sealing member and said metal rigid shell of each of said contamination-resistant external sleeves cooperating with said metal ring of the respective one of said contamination-resistant internal sleeves to define a second lubrication zone that is adjacent to said throttling end part and a third lubrication zone that is adjacent to said fixed end part.

6. The contamination-resistant bearing assembly as claimed in claim 4, wherein said metal ring of each of said contamination-resistant internal sleeves has a fixed section fixedly mounted to the one of said inner ring and said outer ring, and a sloping section inclining and extending from said fixed section toward the other one of said inner ring and said outer ring and away from said rolling unit, said internal sealing member of each of said contamination-resistant internal sleeves being connected at least to said sloping section of said contamination-resistant internal sleeve, said end of said intermediate sealing member of each of said contamination-resistant external sleeves being in contact with a surface of said sloping section of the respective one of said contamination-resistant internal sleeves opposite to said internal sealing member of the respective one of said contamination-resistant internal sleeves.

7. The contamination-resistant bearing assembly as claimed in claim 6, wherein said end of said intermediate sealing member of each of said contamination-resistant external sleeves extends inwardly in the axial direction.

8. The contamination-resistant bearing assembly as claimed in claim 7, wherein said metal rigid shell of each of said contamination-resistant external sleeves further has a waist part connected between said fixed end part and said throttling end part of said metal rigid shell, said inward surface of said metal rigid shell of each of said contamination-resistant external sleeves being recessed outwardly at a position of said waist part in the axial direction in order to accommodate an end section of said metal ring of the respective one of said contamination-resistant internal sleeves.

9. The contamination-resistant bearing assembly as claimed in claim 7, wherein an end section of said metal ring of each of said contamination-resistant internal sleeves cooperates with the other one of said inner ring and said outer ring to define a second throttling gap.

10. The contamination-resistant bearing assembly as claimed in claim 1, wherein said inner ring has an outer surrounding surface that surrounds the axial line, said outer surrounding surface having two outer shoulder parts that are substantially perpendicular to the axial direction, said outer ring having an inner surrounding surface, said inner surrounding surface having two inner shoulder parts that are substantially perpendicular to the axial direction,
wherein each of said contamination-resistant internal sleeves abuts against a respective one of said outer shoulder parts, and said fixed end part of said metal rigid shell of each of said contamination-resistant external sleeves abuts against a respective one of said inner shoulder parts in order to position said contamination-resistant external sleeves and said contamination-resistant internal sleeves relative to said outer ring and said inner ring in the axial direction.

11. The contamination-resistant bearing assembly as claimed in claim 1, wherein said inner ring has an outer surrounding surface that surrounds the axial line, said outer surrounding surface having two outer shoulder parts that are substantially perpendicular to the axial direction, said outer ring having an inner surrounding surface, said inner surrounding surface having two inner shoulder parts that are substantially perpendicular to the axial direction,
wherein each of said contamination-resistant internal sleeves abuts against a respective one of said inner shoulder parts, and said fixed end part of said metal rigid shell of each of said contamination-resistant external sleeves abuts against a respective one of said outer shoulder parts in order to position said contamination-resistant external sleeves and said contamination-resistant internal sleeves relative to said outer ring and said inner ring in the axial direction.

* * * * *